(12) United States Patent
Misao et al.

(10) Patent No.: US 12,115,968 B1
(45) Date of Patent: Oct. 15, 2024

(54) METHOD FOR CONTROLLING VEHICLE AND VEHICLE

(71) Applicant: Nissan Motor Co., Ltd., Yokohama (JP)

(72) Inventors: Yoshihiko Misao, Kanagawa (JP); Kiyoshi Hoshi, Kanagawa (JP); Takahisa Kurosawa, Kanagawa (JP); Jun Inoue, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/681,882

(22) PCT Filed: Sep. 7, 2021

(86) PCT No.: PCT/JP2021/032914
§ 371 (c)(1),
(2) Date: Feb. 7, 2024

(87) PCT Pub. No.: WO2023/037419
PCT Pub. Date: Mar. 16, 2023

(51) Int. Cl.
*B60W 20/16* (2016.01)
*B60W 10/06* (2006.01)
*B60W 10/08* (2006.01)
*B60W 20/14* (2016.01)

(52) U.S. Cl.
CPC ............ *B60W 20/16* (2016.01); *B60W 10/06* (2013.01); *B60W 10/08* (2013.01); *B60W 20/14* (2016.01); *B60W 2510/068* (2013.01); *B60W 2710/0627* (2013.01); *B60W 2710/086* (2013.01)

(58) Field of Classification Search
CPC ...... B60W 20/16; B60W 20/14; B60W 10/06; B60W 10/08; B60W 2510/068; B60W 2710/0627; B60W 2710/086
See application file for complete search history.

(56) References Cited

U.S. PATENT DOCUMENTS

| | | | |
|---|---|---|---|
| 2013/0167508 A1* | 7/2013 | Nishimura | F01N 9/00 60/274 |
| 2017/0051652 A1* | 2/2017 | De Smet | F01N 3/035 |
| 2019/0063295 A1* | 2/2019 | Hattar | F01N 3/0256 |
| 2019/0078490 A1* | 3/2019 | Lee | F01N 3/0814 |
| 2019/0093529 A1* | 3/2019 | Katsuta | F01N 3/103 |
| 2020/0025118 A1* | 1/2020 | Kurita | F01N 9/002 |
| 2020/0040796 A1* | 2/2020 | Yoo | F02D 41/402 |

(Continued)

FOREIGN PATENT DOCUMENTS

| | | |
|---|---|---|
| JP | 2004-225564 A | 8/2004 |
| JP | 2018-65448 A | 4/2018 |

(Continued)

*Primary Examiner* — Hussein Elchanti
(74) *Attorney, Agent, or Firm* — Global IP Counselors, LLP (57) ABSTRACT

A vehicle control method for a vehicle provided with an engine, a generator, and a drive motor. The engine is used to drive the generator to generate electrical power. The electrical power from the generator in turn is used to drive the drive motor. A filter is provided to collects particulate matter in exhaust gas from the engine. A fuel cut-off prohibition of the engine is performed based on a temperature of the filter. A regeneration amount by the drive motor is suppressed according to when a fuel cut-off prohibition condition of the engine is satisfied.

9 Claims, 5 Drawing Sheets

(56) References Cited

U.S. PATENT DOCUMENTS

| | | | |
|---|---|---|---|
| 2020/0200109 A1* | 6/2020 | Phillips | F02D 41/1441 |
| 2022/0154622 A1* | 5/2022 | Golkowski | F01N 9/00 |

FOREIGN PATENT DOCUMENTS

| | | |
|---|---|---|
| JP | 2020-104668 A | 7/2020 |
| JP | 2020-111164 A | 7/2020 |
| JP | 2021-54331 A | 4/2021 |

* cited by examiner

METHOD FOR CONTROLLING VEHICLE AND VEHICLE

CROSS-REFERENCE TO RELATED APPLICATIONS

This application is a U.S. national stage application of International Application No. PCT/JP2021/032914, filed on Sep. 7, 2021.

BACKGROUND

Technical Field

The present invention relates to a vehicle control method and a vehicle.

Background Information

JP2018-065448A discloses a hybrid vehicle that includes an engine having an exhaust system in which a filter for removing particulate matter is installed. In this technology, a fuel cut-off to the engine is prohibited when the filter temperature exceeds or is equal to a prescribed temperature and the amount of particulate matter accumulated in the filter exceeds or is equal to a prescribed accumulation amount. As a result, the operation of the engine (fuel injection) continues, thereby minimizing the combustion of particulate matter and the overheating of the filter due to the oxygen being supplied.

SUMMARY

A series hybrid vehicle includes an engine, a generator, and a drive motor, the engine being used to drive the generator to generate electrical power, which in turn is used to drive the drive motor. Such a vehicle can be decelerated by performing regeneration via the drive motor. Regeneration can be performed when allowed by the power budget of the vehicle, that is, when the regenerative power can be accommodated in terms of the maximum acceptable amount of power.

Therefore, for example, if the battery is fully charged and there is insufficient room for regeneration, regeneration cannot be performed, and thus deceleration cannot be ensured. In such cases, by means of a discharge request and motoring the engine while stopping the fuel supply based on the discharge request, electrical power can be consumed and room for regeneration can be increased. As a result, deceleration by means of regeneration can be ensured.

However, if a fuel cut-off is being prohibited to suppress the filter from overheating, deceleration cannot be ensured by means of motoring. Therefore, if regenerative deceleration is being attempted while a fuel cut-off is prohibited and there is insufficient room for the regenerative power, deceleration by means of regeneration can no longer be carried out, which can result in unintended fluctuations in the rate of deceleration and driver discomfort.

The purpose of the present invention is to suppress unintended fluctuations in deceleration when regenerative deceleration is performed while a fuel cut-off is being prohibited.

A vehicle control method according to one aspect of the present invention includes suppressing the regeneration amount carried out by a drive motor when an engine fuel cut-off prohibition condition has been met in a series hybrid vehicle provided with a filter that collects particulate matter in the exhaust gas from the engine.

BRIEF DESCRIPTION OF THE DRAWINGS

Referring now to the attached drawings which form a part of this original disclosure, selected embodiments of this disclosure are illustrated.

DETAILED DESCRIPTION OF EMBODIMENTS

Embodiments of the present invention will be explained below with reference to the accompanying drawings.

Figure 1:
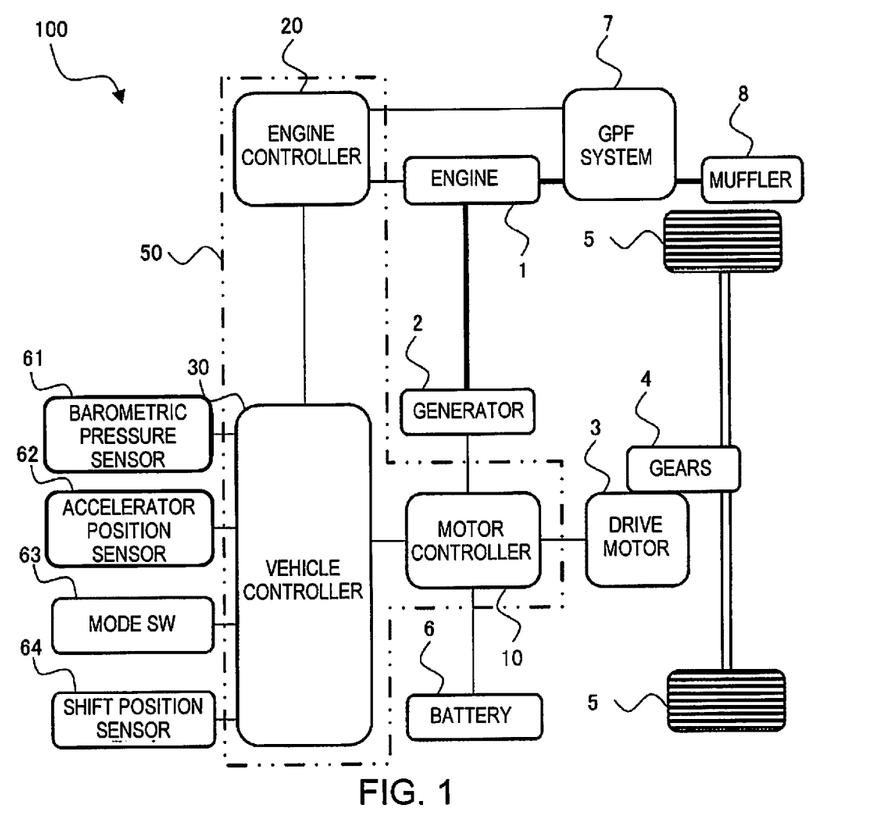
FIG. 1 is a diagram showing a schematized configuration of a vehicle.

FIG. 1 is a diagram showing the schematized configuration of a vehicle 100. The vehicle 100 comprises an engine 1, a generator 2, a drive motor 3, gears 4, drive wheels 5, a battery 6, a gasoline particulate filter (GPF) system 7, and a muffler 8. The vehicle 100 is a series hybrid vehicle and has a series hybrid mode as a driving mode. When the driving mode is the series hybrid mode, the vehicle 100 uses the engine 1 to drive the generator 2 to generate electrical power, and the power generated by the generator 2 is used to drive the drive motor 3.

The engine 1 is a gasoline-powered internal combustion engine. The engine 1 is connected to the generator 2 so that power can be transmitted. The generator 2 is a motor-generator for power generation, and, in addition to generating electrical power, the generator performs motoring of the engine 1. Motoring is performed by driving the engine 1, which is not in operation, with the generator 2. The drive motor 3 is a drive motor-generator and generates driving power DP for the vehicle 100. The driving power DP generated by the drive motor 3 is transmitted to the drive wheels 5 via gear 4 which is a reduction gear. The drive motor 3 also regenerates energy when driven by the power from the drive wheels 5. The energy regenerated as electrical power by the drive motor 3 can be used to charge the battery 6.

The battery 6 stores the electrical power generated by the generator 2 and the power regenerated by the drive motor 3. A discharge request SOC (State of Charge) is set for the battery 6. The SOC is a parameter that indicates the state of charge of the battery 6, and the discharge request SOC is a value that has been set in advance that specifies when the battery 6 is fully charged. That is, the discharge request SOC defines when the battery 6 is fully charged; for example, the battery 6 may be considered fully charged when the SOC is at a charge ratio of 90%.

The GPF system 7 is an exhaust purification system and is provided in the exhaust passage of the engine 1. The GPF system 7 has a GPF, that is, a gasoline particulate filter, and soot, or particulate matter, in the exhaust gas from the engine 1 is collected by means of the GPF. The GPF system 7 includes a GPF temperature sensor and a GPF differential pressure sensor. The GPF temperature sensor detects the GPF temperature T. The GPF temperature T is the base temperature of the GPF, and the GPF temperature sensor detects, for example, the outlet exhaust temperature of the GPF as the actual temperature of the GPF temperature T. The GPF differential pressure sensor detects the differential pressure between the inlet and outlet exhaust pressures of the GPF. The GPF soot accumulation amount S, that is, the amount of soot that has accumulated in the GPF, is estimated based on the differential pressure. Besides the GPF, the GPF system 7 may also include a catalyst, such as a three-way catalyst. The muffler 8 is installed in the exhaust passage of the engine 1 downstream of the GPF system 7 and reduces exhaust noise.

The vehicle 100 further comprises a motor controller 10, an engine controller 20, and a vehicle controller 30. The motor controller 10, the engine controller 20, and the vehicle controller 30 are connected to enable mutual communication. The motor controller 10 consists of one or more microcomputers equipped with a central processing unit (CPU), a read-only memory (ROM), a random access memory (RAM), and an input/output interface (I/O interface). In the motor controller 10, various controls are performed by executing programs stored in the ROM or RAM by the CPU. The same applies to the engine controller 20 and the vehicle controller 30.

The motor controller 10 controls the generator 2 and the drive motor 3. The motor controller 10 also includes a first inverter, which is an inverter for the generator 2, and a second inverter, which is an inverter for the drive motor 3. These inverters may be considered as a separate configuration from the motor controller 10. The motor controller 10 controls the generator 2 and drive motor 3 by controlling the first and second inverters.

The first inverter is connected to the generator 2 and the battery 6. The first inverter converts the alternating current supplied from the generator 2 into direct current and supplies the direct current to the battery 6. As a result, the battery 6 is charged by the power generated by the generator 2. The first inverter also converts the direct current supplied from the battery 6 into alternating current and supplies the alternating current to the generator 2. As a result, the generator 2 is driven by the power from the battery 6. The same applies to the second inverter, the drive motor 3, and the battery 6. Current, voltage, SOC and other signals are also input to the motor controller 10 from the generator 2, the drive motor 3, and the battery 6.

The engine controller 20 controls the engine 1. Signals from the GPF temperature sensor and the GPF differential pressure sensor are input to the engine controller 20. These signals can be further input to the vehicle controller 30 via the engine controller 20. The engine controller 20 prohibits a fuel cut-off to the engine 1 based on the GPF temperature T and the GPF soot accumulation amount S (in other words, based on the GPF temperature T corresponding to the GPF soot accumulation amount S).

Figure 2:
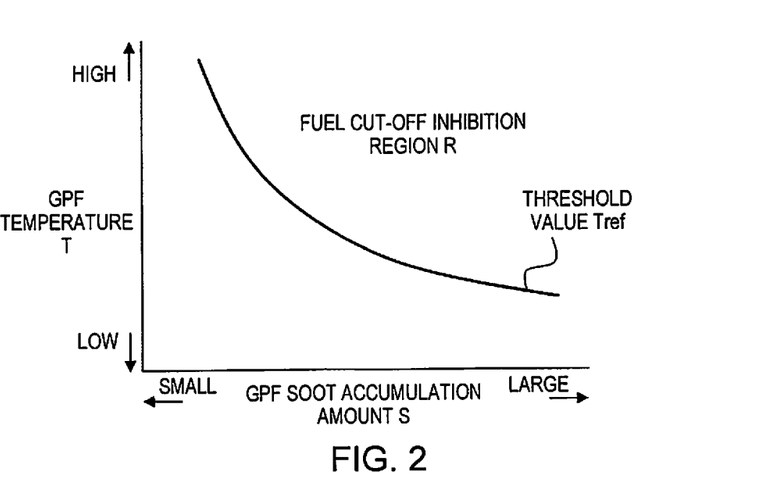
FIG. 2 is a graph showing a fuel cut-off prohibition region.

FIG. 2 is a graph showing the fuel cut-off prohibition region R. As shown in FIG. 2, the fuel cut-off prohibition region R is set in advance using map data according to the GPF soot accumulation amount S and GPF temperature T. The fuel cut-off prohibition region R is defined as the region in which the GPF temperature T is higher than a threshold value Tref. The threshold value Tref is used for defining the fuel cut-off prohibition region R and is set in advance according to the GPF soot accumulation amount S. The greater the GPF soot accumulation amount S, the greater the likelihood that the GPF will overheat due to the combustion of soot. Therefore, the threshold value Tref is set to become smaller as the GPF soot accumulation amount S increases.

Returning to FIG. 1, the vehicle controller 30 integrally controls the engine 1, the generator 2, and the drive motor 3. Signals are input to the vehicle controller 30 from a barometric pressure sensor 61 for detecting barometric pressure, an accelerator opening sensor 62 for detecting the accelerator opening APO, a mode SW 63 for selecting a drive mode by driver operation, and a shift position sensor 64 for detecting a shift position (range) selected by driver operation. The vehicle controller 30 together with the motor controller 10 and the engine controller 20 constitute a controller 50.

Figure 3:
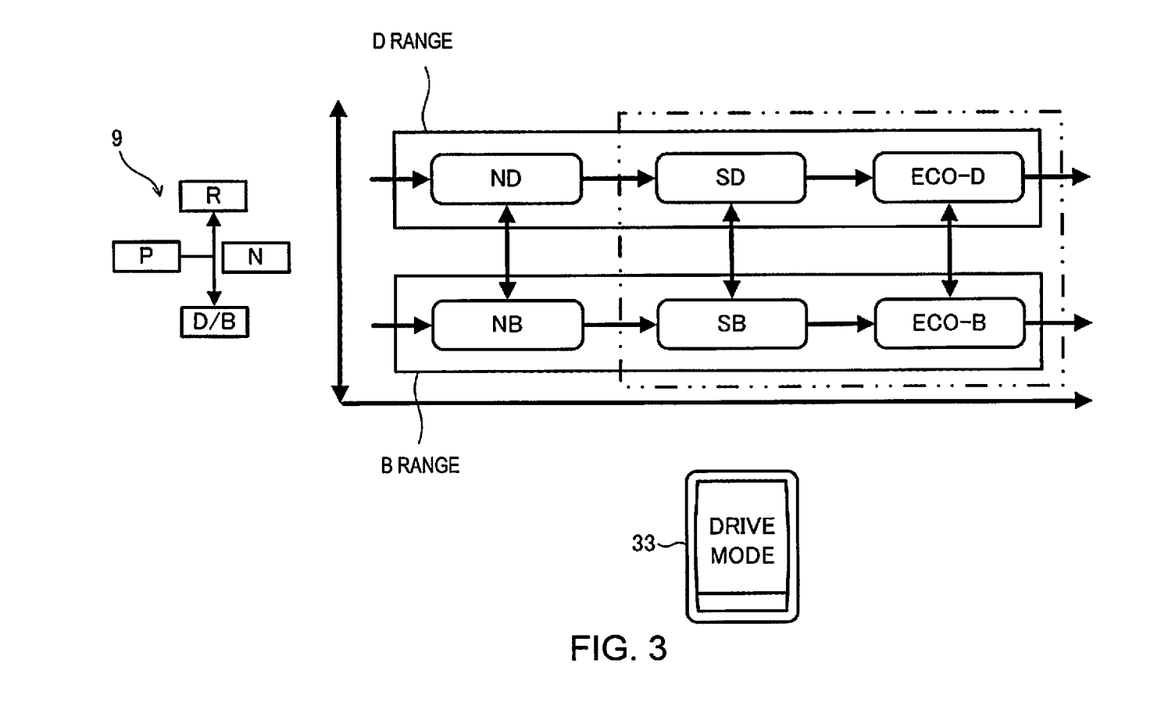
FIG. 3 is a diagram for explaining shift positions and drive modes.

FIG. 3 is a diagram for explaining shift positions and drive modes. The vehicle 100 also includes a shifter 9. The shifter 9 is a device for selecting a shift position by a driver operation, which consists in moving a shift lever or switch gate corresponding to shift positions. The shifter 9 is a momentary shifter. In the momentary shifter 9, the shift lever, when released from driver operation, automatically returns to the home position, i.e., the neutral position.

The shift positions that can be selected by the shifter 9 include, in addition to a D range (a first forward range) and a B range (a second forward range), a P range (a parking range), a R range (a reverse range), a N range (a neutral range). The D range and the B range are selected by operating the shift lever to a common D/B gate. By operating the shift lever to the D/B gate, the B range is selected if the D range is selected, and the D range is selected if the B range is selected. If a range other than the D range or the B range is selected, operating the shift lever to the D/B gate selects the D range.

The drive modes that can be selected by mode SW 63 include an N mode, an S mode, and an ECO mode. The N mode is defined as the mode in which acceleration is performed by operating the accelerator pedal (a normal mode). Therefore, in the N mode, strong regenerative deceleration is not performed by operating the accelerator pedal. The S mode and the ECO mode are modes in which acceleration and regenerative deceleration are performed by operating the accelerator pedal (a first pedal mode), and the ECO mode is more suitable than S mode for fuel efficient driving. Each time the mode SW 63 is pressed, the drive mode changes in the order of the N mode, the S mode, and the ECO mode, and then returns to the N mode after the ECO mode.

In the S mode and the ECO mode, the drive motor 3 performs regeneration, thereby decelerating the vehicle. In other words, deceleration is negative acceleration and is indicated by a negative value. In the S mode, the regeneration limit amount (the magnitude of the regeneration limit) is set larger than that in the ECO mode. In other words, regeneration is less restricted in the S mode than in the ECO mode. Therefore, the power obtained through regeneration is greater in the S mode than in the ECO mode, and the magnitude of the deceleration generated is also greater. the ECO mode constitutes a first drive mode, and the S mode constitutes a second drive mode.

During deceleration, the vehicle 100 can be decelerated by performing regeneration with the drive motor 3. Regeneration can be performed when there is room for regeneration in the power balance of the vehicle 100, that is, when the regenerative power can be accommodated in terms of the maximum acceptable amount of power.

Therefore, for example, if the battery 6 is fully charged and there is insufficient room for regeneration, regeneration cannot be performed, and thus the vehicle cannot be decelerated. In such cases, a discharge request can be made, and based on the discharge request, motoring of engine 1 can be performed to consume electrical power and increase room for regeneration. As a result, deceleration can be ensured through regeneration.

However, when a fuel cut-off is prohibited to minimize overheating of the GPF, motoring cannot be used to ensure deceleration. Therefore, if there is insufficient room for regeneration during deceleration while a fuel cut-off is prohibited, deceleration by means of regeneration cannot be secured, resulting in unintended fluctuations in deceleration, which may produce driver discomfort.

In view of these circumstances, the controller 50 is programmed to perform the following control.

Figure 4:
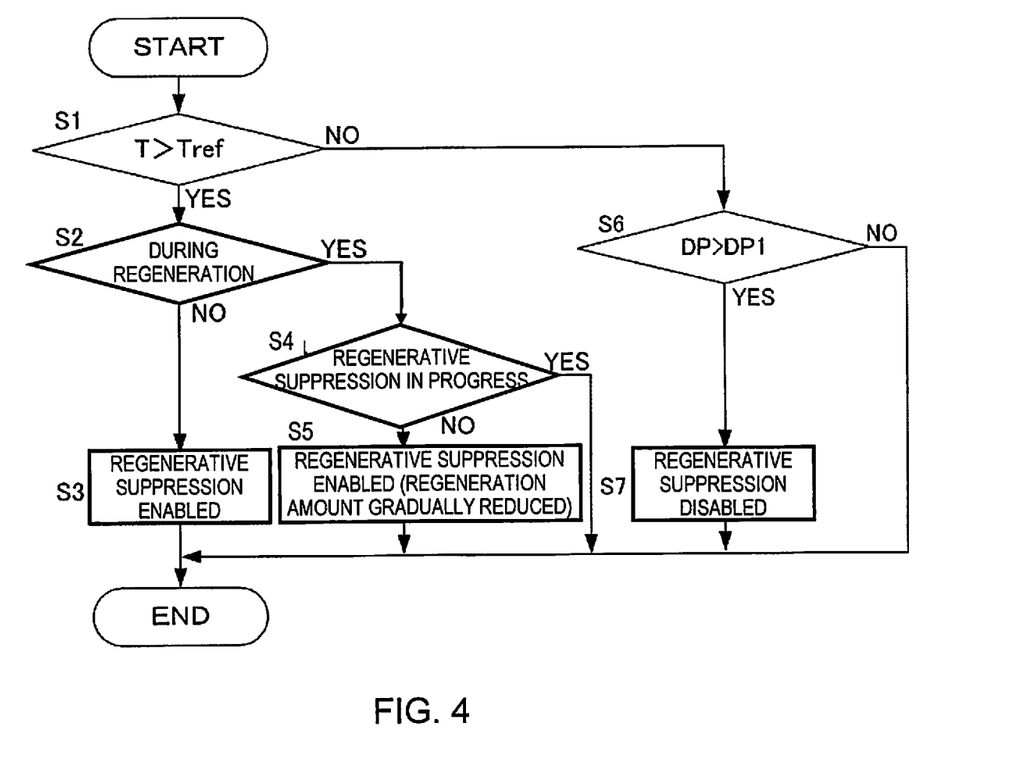
FIG. 4 is a flowchart showing an example of regeneration suppression control.

FIG. 4 is a flowchart showing an example of regeneration suppression control performed by the controller 50. FIG. 4 shows the case in which the drive mode is S mode. In the controller 50, a function of a control unit is realized by execution of the processing shown in the flowchart of FIG. 4. The processing shown in the flowchart of FIG. 4 can be executed repeatedly. The processing shown in the flowchart of FIG. 4 can be performed by the vehicle controller 30, for example.

In Step S1, the controller 50 determines whether the GPF temperature T is higher than threshold value Tref. That is, it is determined whether the fuel cut-off prohibition condition is met. If the determination in Step S1 is affirmative, the GPF status flag (in other words, an FCOI signal) turns on, and the process proceeds to Step S2.

In Step S2, the controller 50 determines whether regeneration is in progress. Whether regeneration is in progress can be determined, for example, by assessing whether target drive torque $TQ_{MOT\_}T$ is negative. The target drive torque $TQ_{MOT\_}T$ can be set in advance using map data corresponding to the accelerator opening APO and vehicle speed VSP, and during regeneration, a negative target drive torque $TQ_{MOT\_}T$, i.e., the target regenerative torque, is calculated based on the map data. If Step S2 has a negative determination, the process proceeds to Step S3.

In Step S3, the controller 50 enables the regenerative suppression. The regenerative suppression is enabled by enabling the first regeneration limit torque $TQ_{MOT\_}L1$ out of the first regeneration limit torque $TQ_{MOT\_}L1$ and the second regeneration limit torque $TQ_{MOT\_}L2$. The second regeneration limit torque $TQ_{MOT\_}L2$ is enabled irrespective of whether the FCOI signal is on or off.

The first regeneration limit torque $TQ_{MOT\_}L1$ is a regeneration limit torque $TQ_{MOT\_}L$ that assumes the case in which the GPF status flag is on, i.e., the case in which a fuel cut-off is prohibited. The second regeneration limit torque $TQ_{MOT\_}L2$ is the regeneration limit torque $TQ_{MOT\_}$ that assumes the case in which the GPF status flag is off, i.e., the case in which a fuel cut-off is not prohibited, and the absolute value of the regeneration limit torque $TQ_{MOT\_}L$ corresponds to the regeneration limit amount. During regeneration, the second regeneration limit torque $TQ_{MOT\_}L2$ is set according to the maximum regenerative power of the system. The maximum regenerative power of the system is the absolute value of the maximum power that can be regenerated by the vehicle 100. Both the first regeneration limit torque $TQ_{MOT\_}L1$ and the second regeneration limit torque $TQ_{MOT\_}L2$ are set in S mode.

As a result of enabling the first regeneration limit torque $TQ_{MOT\_}L1$ in Step S3, the drive torque $TQ_{MOT}$ of the drive motor 3 is limited during regeneration by the smaller of the absolute value of the first regeneration limit torque $TQ_{MOT\_}L1$ and the absolute value of the second regeneration limit torque $TQ_{MOT\_}L2$.

In Step S3, the regenerative suppression is enabled irrespective of whether there is a discharge request in accordance with the SOC and therefore irrespective of whether the battery 6 is fully charged. Thus, in Step S3, the regenerative suppression is enabled even before the FCOI signal is on and before the battery is fully charged, i.e., before the fuel cut-off prohibition state and the fully charged state of the battery 6 coincide. The same applies to Step S5 described further below. After Step S3, processing is temporarily halted.

If the determination in Step S1 is negative, then the process proceeds to Step S6. In Step S6, the controller 50 determines whether the driving power DP of the drive motor 3 exceeds a prescribed value DP1. The prescribed value DP1 is a determination value that is used to determine whether there is an acceleration request and is preset. The prescribed value DP1 is positive and can be set slightly greater than zero. If the determination in Step S6 is negative, processing is temporarily halted. Thus, even if the GPF temperature T drops below the target value Tref and the FCOI signal changes from on to off during the regenerative suppression, the regenerative suppression will not be disabled if the driving power DP is below the prescribed value DP1. If the determination in Step S6 is affirmative, processing proceeds to Step S7.

In Step S7, the controller 50 disables the regenerative suppression. The regenerative suppression is disabled by disabling the first regeneration limit torque $TQ_{MOT\_}L1$. After Step S7, the process is temporarily suspended.

If the determination is affirmative in Step S2, the process proceeds to Step S4, in which the controller 50 determines whether regeneration is being suppressed. If the regenerative suppression is enabled, then it is determined that the regenerative suppression is in effect, and processing is temporarily halted. If the regenerative suppression is disabled, it is determined that the regenerative suppression is not in effect, and the process proceeds to Step S5.

In Step S5, the controller 50 gradually reduces the regeneration amount. In other words, since regeneration is not being suppressed in this case, regeneration is limited using the second regeneration limit torque $TQ_{MOT\_}L2$. Thus, if the first regeneration limit torque $TQ_{MOT\_}L1$ were enabled, the rate of deceleration produced by limiting regeneration using the first regeneration limit torque $TQ_{MOT\_}L1$ would fall rapidly in accordance with its absolute value, resulting in the sensation of a sudden lack of deceleration, which may produce driver discomfort.

Therefore, in Step S5, the absolute value of the regeneration limit torque $TQ_{MOT\_}L$ is gradually reduced so as to progressively become the first regeneration limit torque $TQ_{MOT\_}L1$. This minimizes unintended fluctuations in deceleration that may occur if regeneration has already been performed before the regenerative suppression is activated. After Step S5, the process is temporarily halted.

Figure 5:
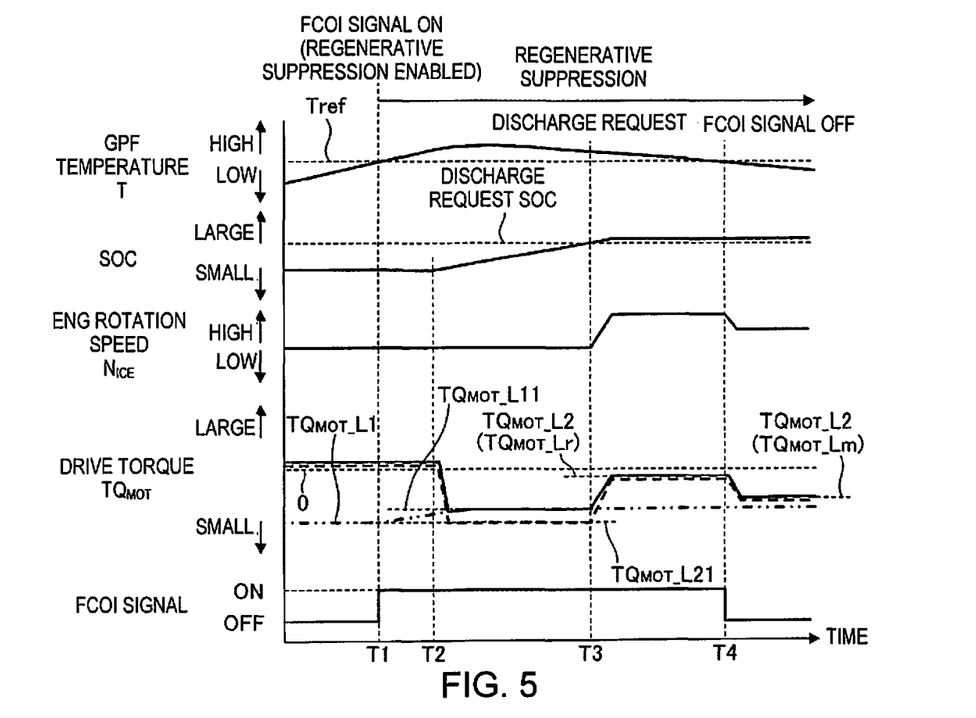
FIG. 5 is a diagram showing a first example of a timing chart.

FIG. 5 is a diagram showing a first example of a timing chart corresponding to FIG. 4. FIG. 5 shows a case in which the road on which a vehicle travels changes from uphill to downhill. The drive torque $TQ_{MOT}$ of the drive motor 3 indicated by the dashed line represents the case of a comparative example in which regeneration is not suppressed.

Prior to the timing T1, the engine 1 is operating to generate electrical power at a constant ENG rotation speed $N_{ICE}$. Therefore, the GPF temperature T gradually increases.

The drive torque $TQ_{MOT}$ is constant and positive, and the vehicle 100 travels uphill. Since the GPF temperature T is below the threshold value Tref, the FCOI signal is off. The SOC decreases very slowly.

At timing T1, GPF temperature T exceeds threshold value Tref. As a result, the FCOI signal turns on. Also, since the FCOI signal is on, the regenerative suppression is in effect. As a result, drive torque $TQ_{MOT}$ is limited by the smaller of the absolute value of the first regeneration limit torque $TQ_{MOT}\_L1$ and the absolute value of the second regeneration limit torque $TQ_{MOT}\_L2$.

Here, the second regeneration limit torque $TQ_{MOT}\_L2$ is set to the drive torque $TQ_{MOT}$ when drive torque $TQ_{MOT}$ is positive, that is, when regeneration is not performed. Further, during regeneration, the drive torque $TQ_{MOT}$ of the drive motor 3 indicated by the dashed line changes while being limited to the second regeneration limit torque $TQ_{MOT}\_L2$. Therefore, the drive torque $TQ_{MOT}$ of the drive motor 3 indicated by the dashed line represents the second regeneration limit torque $TQ_{MOT}\_L2$.

The second regeneration limit torque $TQ_{MOT}\_L2$ is set to the regeneration limit torque $TQ_{MOT}\_L21$ between the timings T2 and T3 and thus when there is no discharge request during regeneration. The regeneration limit torque $TQ_{MOT}\_L21$ is the regeneration limit torque $TQ_{MOT}\_L$ at which the second regeneration limit torque $TQ_{MOT}\_L2$ is set in the absence of a discharge request during regeneration.

The first regeneration limit torque $TQ_{MOT}\_L1$ indicated by the double-dot dashed line is set to the regeneration limit torque $TQ_{MOT}\_L21$ when the drive torque $TQ_{MOT}$ is positive. When the FCOI signal turns on, the absolute value of the first regeneration limit torque $TQ_{MOT}\_L1$ is gradually reduced from regeneration limit torque $TQ_{MOT}\_L21$ to regeneration limit torque $TQ_{MOT}\_L11$. The regeneration limit torque $TQ_{MOT}\_L11$ is the regeneration limit torque $TQ_{MOT}\_L$ when the first regeneration limit torque $TQ_{MOT}\_L1$ is set during regeneration if the FCOI signal turns on.

The absolute value of the regeneration limit torque $TQ_{MOT}\_L11$ is set to be smaller than the regeneration limit torque $TQ_{MOT}L21$. In other words, the absolute value of the regeneration limit torque $TQ_{MOT}\_L21$ is set to be greater than the regeneration limit torque $TQ_{MOT}\_L11$. The regeneration limit torque $TQ_{MOT}\_L21$ is the maximum absolute value of the regeneration limit torque $TQ_{MOT}\_L$ set in the vehicle 100. The absolute value of the regeneration limit torque $TQ_{MOT}\_L11$ corresponds to the first regeneration limit amount and the absolute value of the regeneration limit torque $TQ_{MOT}\_L21$ corresponds to the second regeneration limit amount.

At timing T2, the vehicle 100 approaches a downhill slope, and the accelerator pedal has been released. In other words, the accelerator pedal is not depressed. As a result, the drive torque $TQ_{MOT}$ begins to decrease accordingly and becomes negative. Therefore, regeneration is started and the SOC increases in accordance with the regeneration. Since the drive mode is the S mode, the absolute value of the drive torque $TQ_{MOT}$ decreases significantly. However, due to the regenerative suppression, the drive torque $TQ_{MOT}$ is limited by the first regeneration limit torque $TQ_{MOT}\_L1$ and does not reach the second regeneration limit torque $TQ_{MOT}\_L2$.

In this example, the drive torque $TQ_{MOT}$ is limited by the first regeneration limit torque $TQ_{MOT}\_L1$ as the first regeneration limit torque $TQ_{MOT}\_L1$ changes from regeneration limit torque $TQ_{MOT}\_L21$ to regeneration limit torque $TQ_{MOT}\_L11$. While being limited by the first regeneration limit torque $TQ_{MOT}\_L1$, the drive torque $TQ_{MOT}$ then changes to become regeneration limit torque $TQ_{MOT}\_L11$.

When regeneration is started, the torque of engine 1 is reduced according to the increase in the SOC, thereby reducing the amount of electrical power that is generated and the exhaust energy. Further, as the vehicle 100 travels downhill in this state, the GPF is also cooled by the passing wind. As a result, the GPF temperature T begins to decrease.

At timing T3, the SOC exceeds the discharge request SOC. Therefore, the state in which the FCOI signal is on coincides with the state in which the battery 6 is fully charged. As a result, a retarded discharge is started. Retarded discharge is an example of power consumption mode in which the engine 1 performs combustion while the generator 2 is driving the engine 1 so as to produce negative engine torque in the engine 1. In this power consumption mode, the engine 1 and the generator 2 create a state in which there is more friction torque than engine torque, thereby causing the battery 6 to discharge while the engine 1 performs combustion. With retarded discharge, the ignition timing is retarded as this is occurring and the engine 1 performs combustion. The combustion slows down in this case and the engine torque drops, facilitating the creation of a state in which there is more friction torque than engine torque."

The retarded discharge is performed by the controller 50 when there is a discharge request while a fuel cut-off of the engine 1 is prohibited, i.e., when the FCOI signal is on. Performing a retarded discharge allows the battery 6 to be discharged while preventing overheating of the GPF even when fully charged. During retarded discharge, the engine 1, which performs retarded combustion, is driven by the generator 2. Therefore, when a retarded discharge is started, the ENG rotation speed $N_{ICE}$ increases.

During regeneration, the second regeneration limit torque $TQ_{MOT}\_L2$ changes in accordance with the power consumption of the engine 1 (i.e., the power consumption of the power generation unit comprised of engine 1 and generator 2). The second regeneration limit torque $TQ_{MOT}\_L2$ is set as the regeneration limit torque $TQ_{MOT}\_Lr$ during retarded discharge at the time of retarded discharge, and is set as the regeneration limit torque $TQ_{MOT}\_Lm$ during motoring at the time of motoring. Both the absolute value of the regeneration limit torque $TQ_{MOT}\_Lr$ and the absolute value of the regeneration limit torque $TQ_{MOT}\_Lm$ are smaller than the absolute value of the regeneration limit torque $TQ_{MOT}\_L21$.

The drive torque $TQ_{MOT}$ is limited by the smaller of the absolute value of the effective first regeneration limit torque $TQ_{MOT}\_L1$ and the absolute value of the effective second regeneration limit torque $TQ_{MOT}\_L2$. The absolute values of the second regeneration limit torque $TQ_{MOT}\_L2$ and of the regeneration limit torques $TQ_{MOT}\_Lr$ and $TQ_{MOT}\ Lm$ are smaller than the absolute value of the first regeneration limit torque $TQ_{MOT}\_L1$, $TQ_{MOT}\_L11$.

Therefore, from timing T3, the regeneration limit torque $TQ_{MOT}\_L$ starts transiting from the first regeneration limit torque $TQ_{MOT}\_L1$ to the second regeneration limit torque $TQ_{MOT}\_L2$ (regeneration limit torque $TQ_{MOT}\_Lr$ during retarded discharge). As a result, the drive torque $TQ_{MOT}$ increases to the regeneration limit torque $TQ_{MOT}\_Lr$ during retarded discharge. Since the regeneration limit torque $TQ_{MOT}\_Lr$ during retarded discharge is negative, deceleration continues to occur during retarded discharge.

At timing T4, the GPF temperature T falls below the threshold value Tref. As a result, the FCOI signal turns off. In this case, motoring is performed since a fuel cut-off is not prohibited. As a result, the ENG rotation speed $N_{ICE}$ decreases as compared to during retarded discharge, and the drive torque $TQ_{MOT}$ decreases to the regeneration limit torque $TQ_{MOT\_}Lm$ during motoring. Thus, a deceleration with a greater absolute value than during retarded discharge is ensured.

In the case of the comparative example, regeneration is not suppressed. Therefore, when regeneration is started, the drive torque $TQ_{MOT}$ indicated by the dashed line decreases to the regeneration limit torque $TQ_{MOT\_}L21$. Therefore, the change in drive torque $TQ_{MOT}$ from timing T3 is larger relative to the present embodiment. As a result, the rate of deceleration differs between the comparative example and the present embodiment, as explained below.

Figure 6:
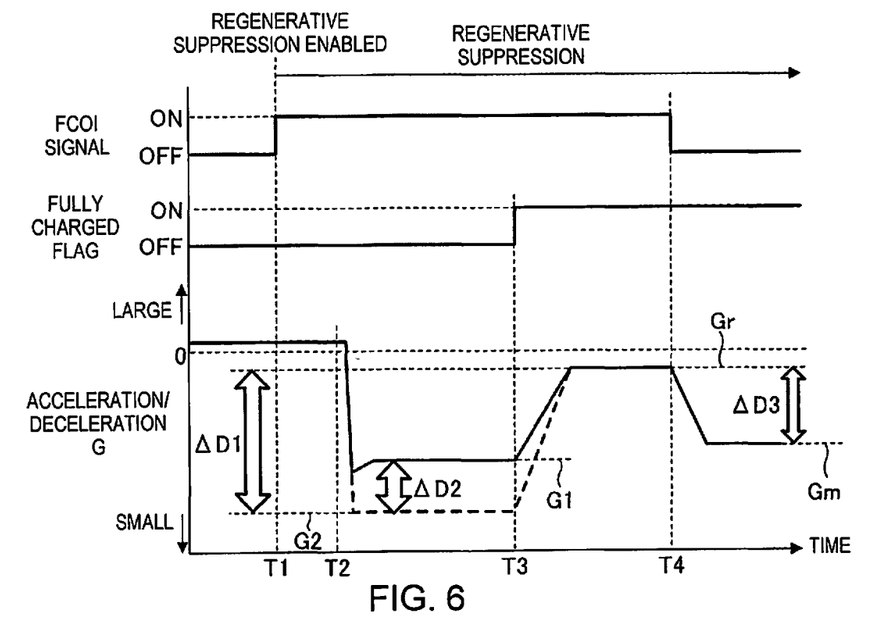
FIG. 6 is a diagram for explaining deceleration corresponding to the first example.

FIG. 6 is a diagram for explaining deceleration corresponding to the first example shown in FIG. 5. In FIG. 6, the FCOI signal, fully charged flag, and acceleration/deceleration G are shown as parameters. The acceleration/deceleration G is the acceleration or deceleration in the longitudinal direction of the vehicle, where negative values indicate deceleration. The acceleration/deceleration G indicated by the dashed line shows the case of the comparative example, as in FIG. 5. The deceleration G1 and deceleration G2 indicate the deceleration corresponding to the regeneration limit torque $TQ_{MOT\_}L11$ and regeneration limit torque $TQ_{MOT\_}L21$, respectively. The deceleration Gr and the deceleration Gm indicate a reduction rate corresponding to the regeneration limit torque $TQ_{MOT\_}Lr$ during retarded discharge and the regeneration limit torque $TQ_{MOT\_}Lm$ during motoring, respectively.

In the case of the comparative example, regeneration is not suppressed. Therefore, when regeneration is started in response to the accelerator pedal being released at timing T2, the acceleration/deceleration G indicated by the dashed line becomes deceleration G2. As a result, when the fully charged flag turns on at timing T3 and retarded discharge starts, a large change in deceleration of difference ΔD1 (absolute value of deceleration G2—absolute value of deceleration Gr) occurs, which may produce driver discomfort.

In the present embodiment, when regeneration is started, the acceleration/deceleration G is restricted to deceleration G1, which has a smaller absolute value than deceleration G2. Therefore, even if the fully charged flag turns on and retarded discharge starts, the magnitude of the change in deceleration is held to be within the difference between the difference ΔD1 and the difference ΔD2 (the difference ΔD2 is the absolute value of the deceleration G2 minus the absolute value of the deceleration G1). As a result, unintended fluctuations in deceleration that may produce driver discomfort are suppressed. In addition, when the FCOI signal turns off at timing T4, motoring can ensure deceleration by producing an absolute value of deceleration which is larger by an amount proportional to the difference ΔD3 (the absolute value of the deceleration Gm minus the absolute value of the deceleration Gr).

Figure 7:
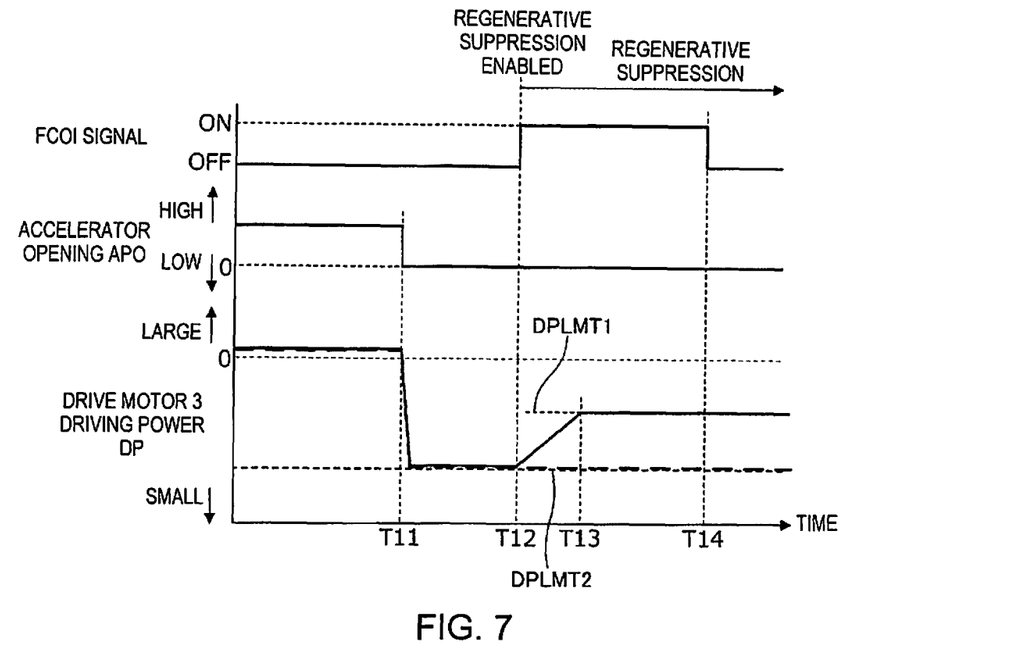
FIG. 7 is a diagram showing a second example of a timing chart.

FIG. 7 is a diagram showing a second example of a timing chart corresponding to FIG. 4. FIG. 7 shows a case in which the FCOI signal is turned on while the accelerator pedal is released. The driving power DP of the drive motor 3, indicated by the dashed line, is the same as in FIG. 6, and shows the case of a comparative example. Like the target drive torque $TQ_{MOT\_}T$, the driving power DP can be found based on a driving power map in which the target driving power is set according to the accelerator opening APO and vehicle speed VSP.

Since the FCOI signal is off at timing T11, the regenerative suppression is not enabled. Therefore, when the accelerator opening APO becomes zero at timing T11, the driving power DP decreases accordingly to the driving power limit value DPLMT2. The driving power limit value DPLMT2 indicates the driving power limit value DPLMT when regeneration is not being suppressed, i.e., the case in the comparative example, and corresponds to the regeneration limit torque $TQ_{MOT\_}L2$.

In this example, when the FCOI signal is turned on while the accelerator pedal is released at timing T12, the regeneration amount is gradually reduced. The reduction in the regeneration amount is performed by gradually decreasing the absolute value of the regeneration limit torque $TQ_{MOT\_}L$ from the second regeneration limit torque $TQ_{MOT}L2$ to the first regeneration limit torque $TQ_{MOT\_}L1$.

As a result, from timing T12 to timing T13, the absolute value of the driving power DP gradually decreases from the driving power limit value DPLMT2 to the driving power limit value DPLMT1. The driving power limit value DPLMT1 indicates the driving power limit value DPLMT when regeneration is being suppressed, i.e., the case of the present embodiment, and corresponds to the regeneration limit torque $TQ_{MOT\_}L11$.

As a result, even if the FCOI signal is turned on while the accelerator is released, the change in deceleration due to the regenerative suppression is gradual. As a result, unintended fluctuations in deceleration that may produce driver discomfort in such situations are suppressed. Although the FCOI signal turns off at timing T14, the regenerative suppression remains enabled. The regenerative suppression is considered disabled in the following cases.

Figure 8:
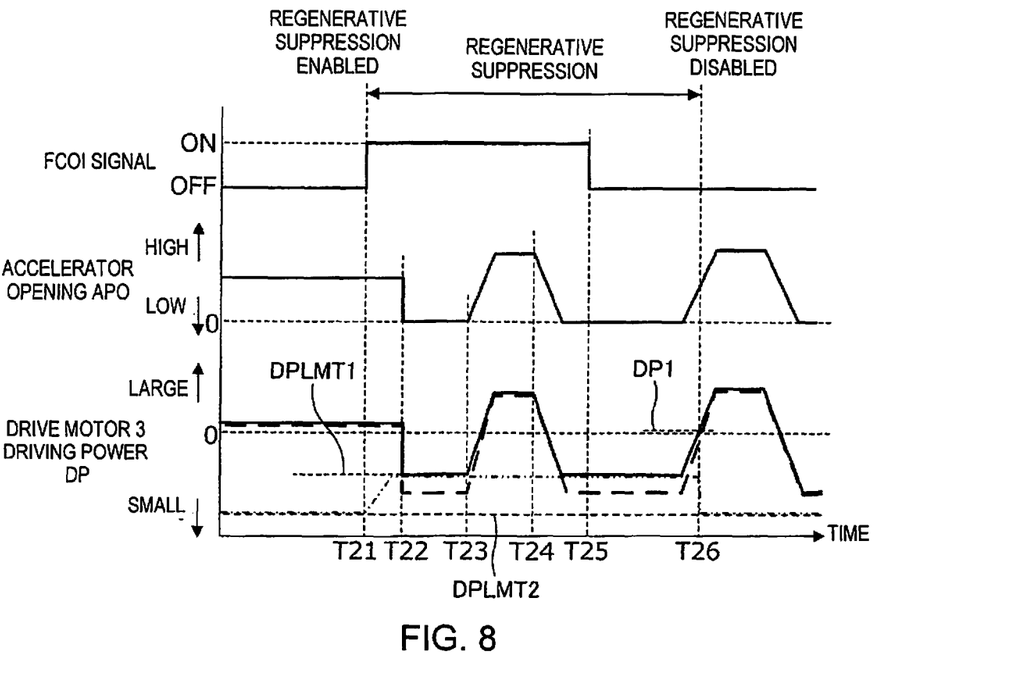
FIG. 8 is a diagram showing a third example of a timing chart.

FIG. 8 is a diagram showing a third example of a timing chart corresponding to FIG. 4. FIG. 8 shows a case in which the accelerator pedal is repeatedly depressed and released in response to changes in the gradient of the road on which a vehicle travels. The driving power DP, indicated by the dashed line, is the same as in FIG. 7 and shows a comparative example.

At timing T21, the FCOI signal is turned on as the vehicle travels uphill, and regeneration is suppressed. At timing T22, the accelerator opening APO becomes zero when starting to travel downhill. As a result, the driving power DP also becomes negative, and regeneration is performed.

In the case of the comparative example, since regeneration is not suppressed, the driving power DP becomes less than the driving power limit value DPLMT1, as indicated by the dashed line. In this example, the driving power DP found based on the driving power map in the comparative example does not reach the driving power limit value DPLMT2. In the present embodiment, the driving power DP is restricted to the driving power limit value DPLMT1 by restricting regeneration.

At timing T23, the accelerator pedal begins to be depressed in response to the change in the slope of the road surface from a downward to an upward slope. As a result, the accelerator opening APO and the driving power DP gradually increase, and when the accelerator opening APO becomes constant, the driving power DP also becomes constant. From timing T24, pressure on the accelerator pedal is relaxed as the slope of the road surface again heads downward, and the accelerator opening APO and driving power DP are gradually decreased accordingly. The accelerator opening APO eventually becomes zero, and the driving power DP finally reaches the driving power limit value DPLMT1.

At timing T25, the FCOI signal is turned off and the fuel cut-off prohibition condition is no longer satisfied. Therefore, since the case in which the FCOI signal is on does not coincide with the case in which the battery is fully charged, the regeneration is suppressed in preparation for such a situation can be disabled. However, if the regenerative suppression is disabled at timing T25, the driving power limit value DPLMT1 becomes invalid, resulting in a decrease in the driving power DP. As a result, unintended fluctuations in deceleration may cause driver discomfort.

In the present embodiment, the regenerative suppression is continued until timing T25 when the FCOI signal turns off, and the regenerative suppression is disabled at timing T26 when the driving power DP exceeds the prescribed value DP1. As a result, after the FCOI signal turns off, the regenerative suppression is disabled after it is ascertained that the acceleration corresponds to the driver's acceleration request, thereby making it possible to prevent unintended fluctuations in the rate of deceleration when disabling the regenerative suppression.

The main effects of the present embodiment will now be explained.

The vehicle 100 includes an engine 1, a generator 2, and a drive motor 3, the engine 1 being used to drive the generator 2 to generate electrical power, the electrical power generated by the generator 2 is used to drive the drive motor 3, and the GPF system 7 collects soot, i.e., particulate matter in the exhaust from the engine 1. The control method for the vehicle 100 includes performing motoring by driving the stopped engine 1 with the generator 2, thereby cutting off fuel from the engine 1 and consuming electrical power, and prohibiting the cutting off of fuel from the engine 1 based on the GPF temperature T, and restricting the regeneration amount by the drive motor 3 when the FCOI signal turns on, that is, when the fuel cut-off prohibition condition of the engine 1 is satisfied.

By means of this method, it is possible to preliminarily reduce the absolute value of the deceleration prior to the state in which the FCOI signal is on at the time of deceleration coincides with the fully charged state of the battery. Therefore, fluctuations in the rate of deceleration can be minimized by reducing the difference in the rates of deceleration before and after the battery is fully charged, even when the absolute value of the rate of deceleration is smaller than when motoring is used to perform discharging, since regeneration is performed in response to any discharging which can be executed once the FCOI signal has turned on and the battery is fully charged thereafter. As a result, unintended fluctuations in deceleration that may produce driver discomfort can be suppressed.

In the present embodiment, if the FCOI signal turns on during regeneration via the drive motor 3, the regeneration amount is gradually reduced. By means of this method, even if the FCOI signal turns on during regeneration, by moderating the fluctuations in deceleration caused by the regenerative suppression, unintended fluctuations in deceleration that may produce driver discomfort can be suppressed.

In the present embodiment, as described above using FIG. 8, is continued until timing T25 when the FCOI signal turns off, and regenerative control is disabled at timing T26 when the driving power DP exceeds the prescribed value DP1. As a result, after the FCOI signal turns off, the regenerative suppression can be disabled after acceleration in accordance with the driver's acceleration request is confirmed, thereby preventing unintended fluctuations in deceleration when the regenerative suppression is disabled.

The vehicle 100 has a regeneration limit torque $TQ_{MOT\_}L11$ and a regeneration limit torque $TQ_{MOT\_}L21$, which has a larger absolute value than regeneration limit torque $TQ_{MOT\_}L11$, as regeneration limit torque $TQ_{MOT\_}L$. When the FCOI signal turns on, by enabling regeneration limit torque $TQ_{MOT\_}L11$, the regeneration amount is restricted compared to when the FCOI signal is off. By means of this method, fluctuations in the rate of deceleration produced when the FCOI signal turns on and the battery is fully charged can be appropriately minimized by using the regeneration limit torque $TQ_{MOT\_}L$, which takes drivability into consideration, as the regeneration limit torque $TQ_{MOT\_}L11$.

The vehicle 100 has an ECO mode and an S mode in which the absolute value of the regeneration limit torque $TQ_{MOT\_}L$ is set higher in than in ECO mode, and the regeneration limit torque $TQ_{MOT\_}L11$ and $TQ_{MOT\_}L21$ are set in S mode. At the start of regeneration, the absolute value of deceleration is greater in the S mode than in the ECO mode, which means that the fluctuations in deceleration when the FCOI signal turns on and the battery is fully charged more readily cause driver discomfort. Therefore, according to this method, even if the FCOI signal is on and the battery is fully charged in S mode, large fluctuations in deceleration that occur at that time can be suppressed, which is of great significance in suppressing unintended fluctuations in deceleration.

In the present embodiment, the absolute value of the regeneration limit torque $TQ_{MOT\_}L21$ is the maximum value of the regeneration limit torque $TQ_{MOT\_}L$ set in the vehicle 100. By means of this method, as a result of performing regeneration at the regeneration limit torque $Q_{MOT\_}L21$ as in the comparative example, large fluctuations in deceleration can be prevented from occurring when the FCOI signal is on and the battery is fully charged, which is of great significance in suppressing unintended fluctuations in deceleration.

In the present embodiment, the fuel cut-off prohibition condition is determined based on the GPF temperature T. By means of this method, as a result of the combination of the battery being fully charged and fuel cut-off being prohibited due to the GPF temperature T, a method is obtained in which unintended fluctuations in deceleration that may occur when motoring cannot be used to perform discharging can be suppressed.

In the present embodiment, if a discharge request is made when the FCOI signal is on, a retarded discharge, in which the ignition timing is retarded and combustion in the engine 1 is performed while engine 1 is driven by the generator 2 to generate negative engine torque in the engine 1, is executed as a power consumption operation. According to this method, even when the battery 6 is fully charged, the battery can be discharged while minimizing overheating of the GPF. Further, in retarded discharge performed as a power consumption operation, the deceleration obtained by regeneration has a smaller absolute value than in the case of discharging by motoring. In other words, in this case, the difference in the rate of deceleration before and after the battery is fully charged can be large if regeneration is not suppressed. Therefore, in this case, it is highly significant to suppress unintended fluctuations in deceleration.

Although an embodiment of the present invention has been described above, the foregoing embodiment constitutes only a part of the application examples of the present invention, and is not intended to limit the technical scope of the present invention to the specific configuration of the foregoing embodiment.

For example, the power consumption operation may be a negative torque operation in which the engine 1 in idle operation is driven by the generator 2 to generate negative torque in the engine 1.

The invention claimed is:

1. A vehicle control method for a vehicle provided with an engine, a generator, a drive motor, and a filter that collects particulate matter in exhaust gas from the engine, the engine being used to drive the generator to generate electrical power, which electrical power generated by the generator is used to drive the drive motor, comprising:
   motoring performed by driving the engine with the generator in a stopped state, thereby cutting off fuel to the engine and consuming electrical power;
   performing a fuel cut-off prohibition of the engine based on a temperature of the filter; and
   suppressing a regeneration amount by the drive motor according to when a fuel cut-off prohibition condition of the engine is satisfied.

2. The vehicle control method according to claim 1, further comprising
   gradually reducing the regeneration amount where the fuel cut-off prohibition condition is satisfied during regeneration by the drive motor.

3. The vehicle control method according to claim 1, further comprising
   continuing the suppressing of the regeneration amount where the fuel cut-off prohibition condition is not satisfied, and disabling the suppressing of the regeneration amount where the driving power of the drive motor exceeds a prescribed value.

4. The vehicle control method according to claim 1, wherein
   the vehicle has a first regeneration limit amount and a second regeneration limit amount, which is larger than the first regeneration limit amount, as regeneration limit amounts, and
   enabling the first regeneration limit amount to suppress the regeneration amount more when the fuel cut-off prohibition condition is satisfied, than when the fuel cut-off condition is not satisfied.

5. The vehicle control method according to claim 4, wherein
   the vehicle has a first drive mode and a second drive mode in which the regeneration limit amount is set higher than the first drive mode, and the first regeneration limit amount and the second regeneration limit amount are set in the second drive mode.

6. The vehicle control method according to claim 4, wherein
   the second regeneration limit amount is a maximum value of the regeneration limit amount set for the vehicle.

7. The vehicle control method according to claim 1, wherein
   the fuel cut-off prohibition condition is determined based on the temperature of the filter.

8. The vehicle control method according to claim 1, further comprising
   when a discharge request is received during the fuel cut-off prohibition to the engine, performing a power consumption operation to generate negative engine torque in which the engine is driven by the generator while combustion is performed in the engine.

9. A vehicle comprising: an engine, a generator, a drive motor, and a filter for collecting particulate matter in exhaust gas from the engine, wherein
   the engine is used to drive the generator to generate electrical power, which electrical power generated by the generator is used to drive the drive motor,
   the engine in a stopped state is driven by the generator to perform motoring, thereby performing a fuel cut-off and consuming electric power,
   a fuel cut-off prohibition to the engine is performed based on a filter temperature; and
   a control unit configured to suppress a regeneration amount by the drive motor according to when a fuel cut-off prohibition condition of the engine is satisfied.

* * * * *